(12) United States Patent
Durrant

(10) Patent No.: US 11,480,739 B2
(45) Date of Patent: Oct. 25, 2022

(54) OPTICAL FIBER STUB HAVING A DEMOUNTABLE INSULATING RECEPTACLE CAP WITH AN ALIGNMENT SLEEVE AND, ALTERNATIVELY, A VENT HOLE

(71) Applicant: Optical Fiber Packaging, Ltd., Haverhill (GB)

(72) Inventor: Richard C. E. Durrant, Crystal Lake, IL (US)

(73) Assignee: Optical Fiber Packaging, Ltd.

(\*) Notice: Subject to any disclaimer, the term of this patent is extended or adjusted under 35 U.S.C. 154(b) by 0 days.

(21) Appl. No.: 17/206,094

(22) Filed: Mar. 18, 2021

(65) Prior Publication Data

US 2021/0208341 A1    Jul. 8, 2021

Related U.S. Application Data

(63) Continuation-in-part of application No. 17/120,387, filed on Dec. 14, 2020, which is a continuation of application No. 16/740,434, filed on Jan. 11, 2020, now Pat. No. 10,866,366, which is a continuation-in-part of application No. 16/572,725, filed on Sep. 17, 2019, now Pat. No. 10,761,277.

(60) Provisional application No. 62/732,493, filed on Sep. 17, 2018.

(51) Int. Cl.
*G02B 6/38* (2006.01)

(52) U.S. Cl.
CPC ........... *G02B 6/3846* (2013.01); *G02B 6/381* (2013.01)

(58) Field of Classification Search
CPC .... G02B 6/3846; G02B 6/381; G02B 6/3861; G02B 6/3874
See application file for complete search history.

(56) References Cited

U.S. PATENT DOCUMENTS

| 5,363,461 | A  | * | 11/1994 | Bergmann | ........... G02B 6/3846 385/78 |
| 6,536,956 | B2 | * | 3/2003  | Luther   | ................. G02B 6/3885 385/86 |
| 9,316,791 | B2 | * | 4/2016  | Durrant  | ............. G02B 6/38875 |
| 9,331,426 | B2 | * | 5/2016  | Adams    | ............... H01R 13/6273 |
| 9,588,304 | B2 | * | 3/2017  | Durrant  | ............. G02B 6/38875 |
| 9,726,832 | B2 | * | 8/2017  | Durrant  | ............. G02B 6/3887 |
| 10,761,277 | B2 | * | 9/2020 | Durrant  | ................. G02B 6/421 |
| 10,866,366 | B2 | * | 12/2020 | Durrant | ............... G02B 6/3861 |
| D932,292 | S  | * | 10/2021 | Holdcroft | ...................... D8/394 |
| 2003/0021548 | A1 | * | 1/2003 | Luther | ................. G02B 6/3885 385/86 |

(Continued)

*Primary Examiner* — Andrew Jordan
(74) *Attorney, Agent, or Firm* — Steven M. Evans; Chicago IP Law

(57) ABSTRACT

Optical fiber stub having a first end and a second end, and a base on an outer surface of the stub body. A receptacle cap having a tubular body with a locking end and a receiving end, wherein an inner surface of the locking end includes an inner rim for receiving and securing a clip therein. A polymer insulating insert having a first plurality of clips on a first side and a second plurality of clips on the second side, wherein the first plurality of clips are configured to clip onto and secure the polymer insulating insert to the base of the stub body, and the second plurality of clips are configured to clip onto and secure the polymer insulating insert to the inner rim within the locking end of the receptacle cap.

19 Claims, 8 Drawing Sheets

(56) References Cited

U.S. PATENT DOCUMENTS

| | | | |
|---|---|---|---|
| 2014/0355936 A1* | 12/2014 | Bund | G02B 6/3887 |
| | | | 385/81 |
| 2020/0088957 A1* | 3/2020 | Durrant | G02B 6/3855 |
| 2020/0150352 A1* | 5/2020 | Durrant | G02B 6/381 |
| 2021/0096304 A1* | 4/2021 | Durrant | G02B 6/3861 |
| 2021/0208341 A1* | 7/2021 | Durrant | G02B 6/381 |

\* cited by examiner

FIG. 2

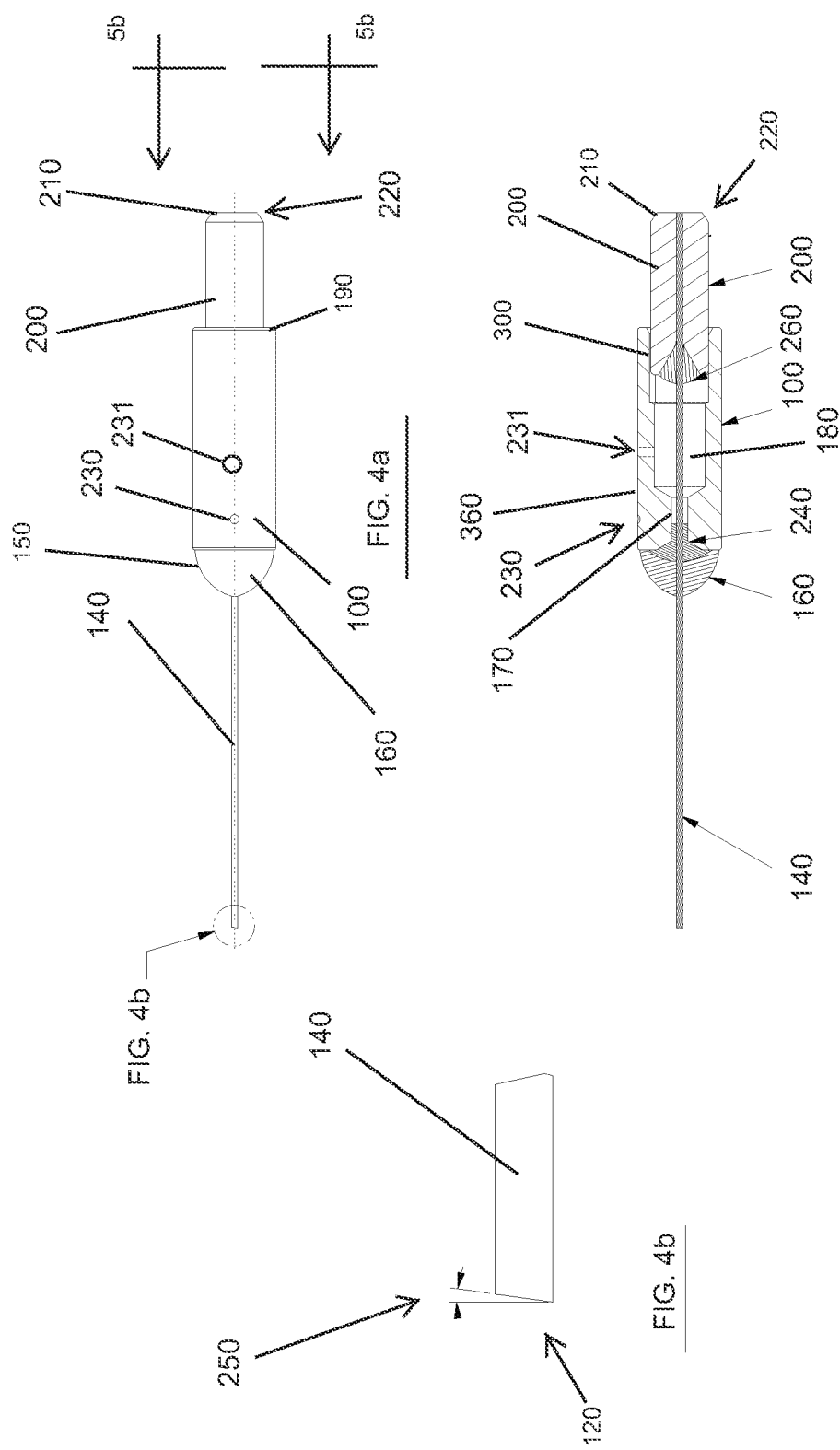

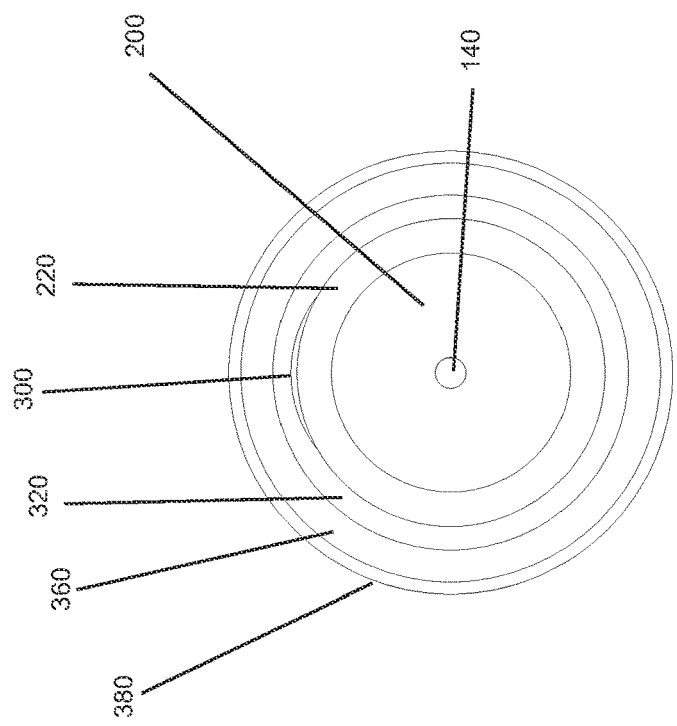
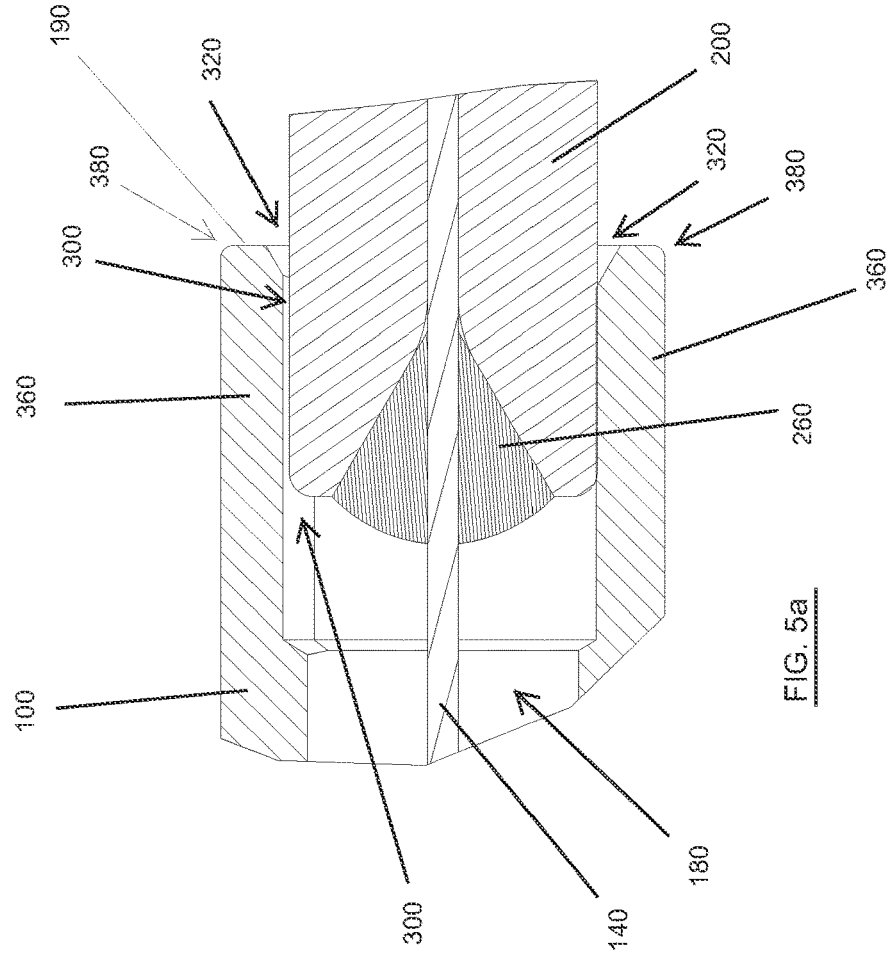
FIG. 5b
FIG. 5a

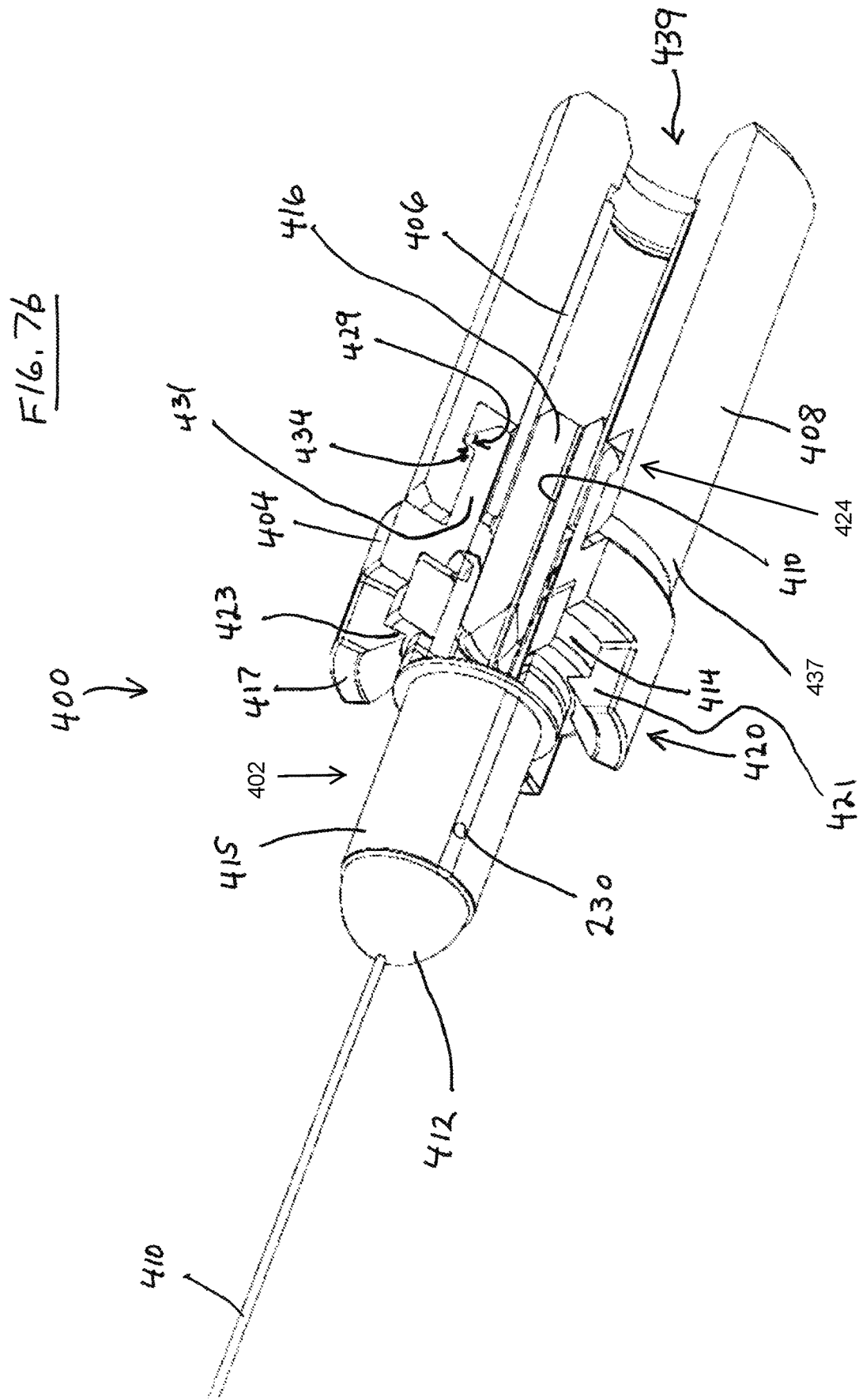

OPTICAL FIBER STUB HAVING A DEMOUNTABLE INSULATING RECEPTACLE CAP WITH AN ALIGNMENT SLEEVE AND, ALTERNATIVELY, A VENT HOLE

CROSS-REFERENCE TO RELATED APPLICATIONS

This application is a Continuation-in-Part of application Ser. No. 17/120,387, filed on Dec. 14, 2020, which is a Continuation of application Ser. No. 16/740,434, filed on Jan. 11, 2020, now U.S. Pat. No. 10,866,366, which is a Continuation-in-Part of application Ser. No. 16/572,725, filed on Sep. 17, 2019, now U.S. Pat. No. 10,761,277, which claims priority to provisional application 62/732,493, filed on Sep. 17, 2018. Each of the applications referenced immediately above in this paragraph are herein incorporated by reference.

BACKGROUND OF THE INVENTION

Field of the Invention

The present invention relates generally to optic fiber connectors, and more particularly, to receptacles for optical fiber stubs.

Description of Related Art

Optical fiber stubs are used in telecommunication systems and devices for systems such as for Transmit Optical Sub Assemblies (TOSAs) and Receiving Optical Sub Assemblies (ROSAs). A fiber stub has two ends, wherein one end includes an optical fiber mounted within a ferrule or connector interface. Normally the opposing end of an optical fiber stub has the fiber coupled directly or indirectly to an emitter or receiver electrooptic device, which is located within the optoelectronic module. The optical fiber includes both a core and a cladding. The optical fiber includes glass materials with several refractive indices, typically one with a higher numerical aperture that clads to another at the core of the fiber.

After an optical fiber stub is secured adjacent to a TOSA or ROSA within an electronic device using such optical devices, a receptacle cap typically is glued or welded to be permanently secured over the optical fiber stub. The receptacle cap includes an alignment sleeve for coupling and properly positioning an external optical ferrule containing an optical fiber adjacent to the optical fiber stub for efficient transmission of optical signals between the external optical ferrule and the optical fiber stub.

During assembly, testing, and interchanging external optical ferrules within the alignment sleeve of the receptacle cap, dirt or other impurities and occasional mechanical damage, can accumulate or occur on the outer end or end face of the optical fiber stub, thus negatively affecting the ability of the optical fiber to transmit or receive optical signals. Since the receptacle cap conventionally is permanently secured over the optical fiber stub, it can be very difficult to clean or re-polish to repair the outer end of the optical ferrule of the optical fiber stub. Since an electronic device utilizing optical fiber stubs can be expensive, reduced performance of an optical fiber stub due to contamination of the outer end of the optical ferrule of the optical ferrule stub that is permanently covered by a receptacle cap can have serious negative consequences.

Accordingly, there is a need for a design that enables the end face of an optical ferrule of an optical fiber stub covered by a receptacle cap to be easily accessible for cleaning, while maintaining proper alignment of an alignment sleeve within the receptacle cap relative to the optical fiber stub.

ASPECTS AND SUMMARY OF THE PRESENT INVENTION

One aspect of the present invention is to provide a removable receptacle cap for an optical fiber stub to enable the end face of the optical ferrule of the optical fiber stub to be easily cleaned or re-polished without damaging the optical fiber stub or the electronic apparatus to which the optical fiber stub is secured.

Another aspect of the present invention is to reduce manufacturing and repair costs.

In order to achieve these and other aspects, the present invention provides an optical fiber stub assembly, comprising a stub body having a first end and a second end, wherein an outer surface of the first end is threaded, and a stop surface is located at an end of the outer threaded surface of the first end. A receptacle cap having a tubular body with a base end and a receiving end, wherein an inner surface of the base end is similarly threaded to mate with the outer threaded surface of the first end, so that the base end of the receptacle cap can be screwed over and around the first end of the stub body. The receiving end of the receptacle cap includes two opposing flat surfaces on an outer surface, so as to enable a tool to grip the outer surface of the receiving end of the receptacle cap and unscrew the receptacle cap from the stub body. An alignment sleeve is located within the receptacle cap for receiving and properly positioning an optical ferrule relative to an end face of the optical ferrule of the stub body.

Another aspect of the present invention disclosed herein enables gases created during the sealing process of a hermetic-version of the stub, when the fiber stub is to be glass sealed at one end, to escape without damaging the hermeticity of the glass seal itself.

A further aspect of the present invention is to produce resilient hermetic seals in hermetic fiber stubs.

In order to achieve these and other aspects, another embodiment of the present invention provides a vent or slot between the ferrule and stub body that enables gases generated from the low melting glass sealing process of an optical fiber to the ferrule stub to escape, thus creating a stronger and more resilient and reliable seal between the optical fiber and low melting point glass and the stub body, creating the hermetic seal. Without such a vent, which is the conventional configuration, generated gases are forced into the molten glass during the sealing process, thus reducing the strength or resilience of the hermetic seal.

In accordance with a further embodiment of the present invention, an optical fiber stub is provided having a first end and a second end, and a base extending beyond an outer surface of the stub body. A receptacle cap or receptacle chimney having a tubular body with a locking end and a receiving end, wherein an inner surface of the locking end includes an internal rim or inner rim or recesses for receiving and securing a clip within. A polymer insulating insert having a first plurality of clips or annular clipping surfaces on a first side, and a second plurality of clips or annular clipping surfaces on the second side, wherein the first plurality of clips or annular clipping surface are configured to clip onto and secure the first side of the polymer insulating insert to the base of the stub body, and the second plurality of clips or annular clipping surface are configured to clip onto and secure the second side of the polymer insulating insert to the locking end of the receptacle cap. The polymer construction of the polymer insulating insert functions to provide electrical insulation between the optical fiber stub and the receptacle cap. Additionally, the color of the polymer insulating insert can be varied to indicate an optical signal input or an optical signal output.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is a cross-sectional view of the optical fiber stub and demountable receptacle cap shown in FIG. 1;

FIG. 1b is an end view of the demountable receptacle cap shown in and taken along line 1b-1b of FIG. 1;

FIG. 1c is an enlarged cross-sectional view of the threaded outer surface of the first end of the stub body and the threaded inner surface of the base end of the receptacle cap shown in FIG. 1a;

FIG. 2 is an enlarged perspective end view of the optical fiber stub and the receptacle cap shown in FIG. 1.

FIG. 4a is a side view of a hermetic stub fiber body, ferrule, and optical fiber configured in accordance with another embodiment of the present invention;

FIG. 4b is an enlarged view of the tip of the optical fiber shown in FIG. 4a;

FIG. 4c is a cross-sectional view of the hermetic stub fiber body, ferrule, and optical fiber shown in FIG. 4a;

FIG. 5a is an enlarged cross-sectional view of the mechanical interface configuration between the ferrule and fiber stub body shown in FIG. 4c;

FIG. 5b is an enlarged end view of the hermetic stub fiber assembly shown in and taken along line 5b-5b of FIG. 4a;

FIG. 6 is a cut away view of the hermetic stub fiber body, ferrule, and optical fiber shown in FIG. 4a;

FIG. 7b is a cut-away, non-exploded perspective view of the optical fiber stub assembly shown in FIG. 7a.

DETAILED DESCRIPTION OF THE PREFERRED EMBODIMENTS

Figure 1:
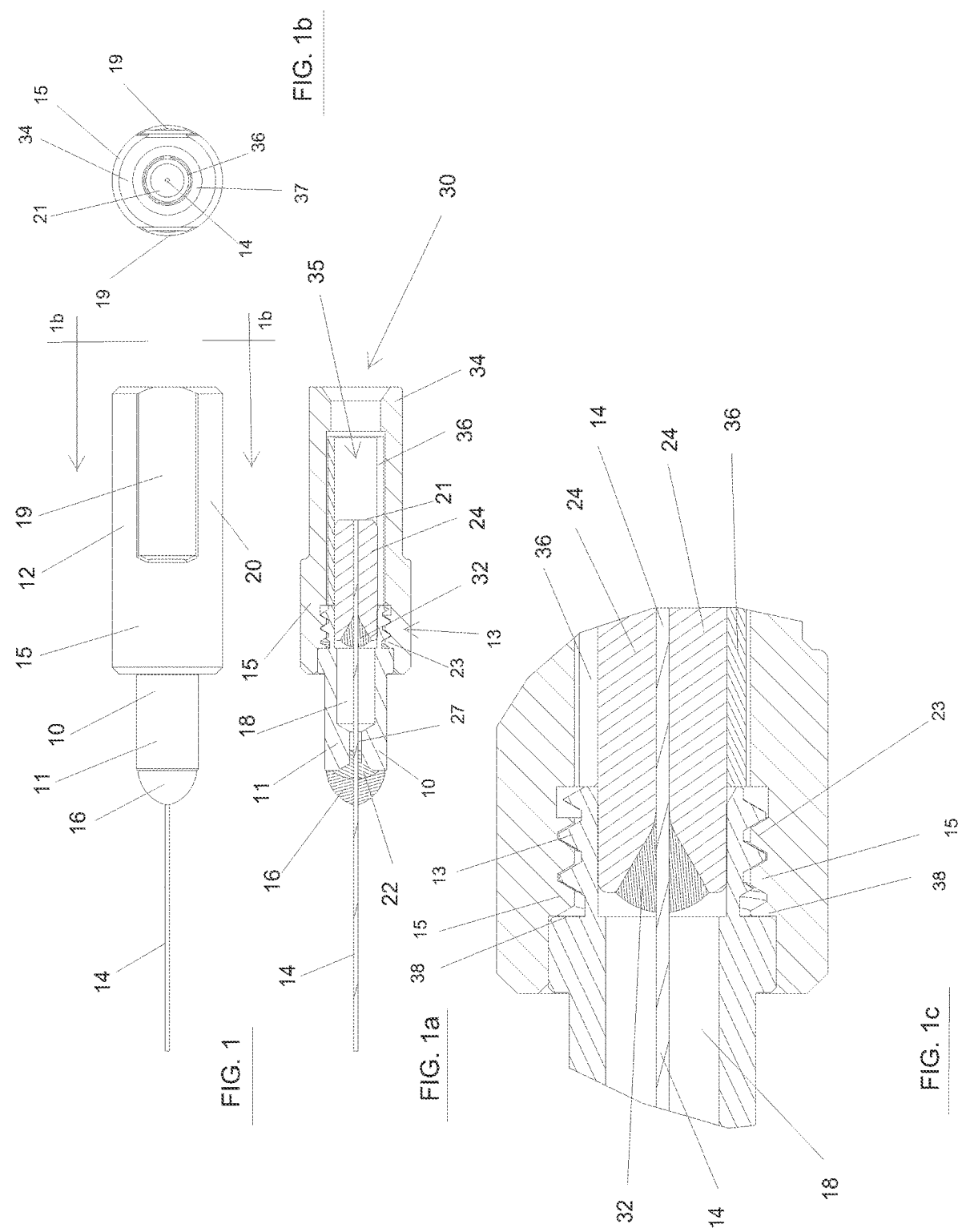
FIG. 1 is a side view of an optical fiber stub having a demountable receptacle cap with an alignment sleeve configured in accordance with the present invention.

Referring now to the drawings, FIG. 1 is a side view of an optical fiber stub 10 connected to a receptacle cap 12 configured in accordance with a first embodiment of the present invention. An optical fiber 14 is shown exiting a second end 11 (FIG. 1a) of the optical fiber stub 10. The second end 11 of the optical fiber stub 10 includes support resin 16 for supporting the optical fiber 14 within the second end 11 of the optical fiber stub 10. The support resin 16 is applied on top of a low melting point glass seal 22 (FIG. 1a) to support the mechanical transition of the optical fiber 14 exiting the glass seal 22. Without the support resin 16 the glass seal 22 and the optic fiber 14 transition or connection would be prone to breakage. Further illustrated is one of the two opposing flat surfaces 19 on the outer surface 20 of the receptacle cap 12.

FIG. 1a is a cross-sectional view of the optical fiber stub 10 shown in FIG. 1. Illustrated are the optical fiber 14 and the support resin 16 for the glass hermetic seal 22. The support resin 16 is typically used to mechanically support the transition of the optic fiber 14 to air from the hard glass seal 22. Further illustrated in FIG. 1a is the optical fiber 14 extending completely through the optical fiber stub 10 and to the outer end 21 of the optical ferrule 24.

A pass-through or channel 27 is provided into which the optical fiber 14 is typically hermetically sealed with the glass seal 22, for example, which is low melting point glass. An inner chamber 18 is shown within the optical fiber stub 10. Further illustrated is the epoxy resin 32 used for optical fiber termination within the ferrule 24. The optical fiber 14 passes through the support resin 16, the glass seal 22, the channel 27, the inner chamber 18, and the optical ferrule 24. The hermetic glass seal 22 forms a hermetic seal around the optical fiber 14 between the support resin 16 and in the channel 27.

The ferrule tip or end 21 may have a chamfer for easier insertion into the receptacle cap 12. The first end 13 of the optical fiber stub 10 is located within the base end 15 of the receptacle cap 12. The end-face 21 of the ferrule 24 and the optical fiber 14, which is glued within the ferrule 24, are both typically polished to a fine finish to allow an efficient optical connection to another connector interface via a split sleeve arrangement.

In accordance with the present invention, the first end 13 of the optical fiber stub 10 is located within the base end 15 of the receptacle cap 12. Further, in accordance with the present invention, the outer surface 17 of the first end 13 of the optical fiber stub 10 is threaded, and the inner surface 23 of the base 15 of the receptacle cap 12 is threaded to mate with the threading 17 of the first end 13 optical fiber stub 10. In this manner the receptacle cap 12 can be screwed around and over the first end 13 of the optical fiber stub 10. The receptacle cap 12 can be unscrewed from the optical fiber stub 10 in order to expose the end face or outer end 21 of the optical ferrule 24 and optical fiber 14 for easily cleaning or polishing without damaging the apparatus to which the optical fiber stub 10 is mounted.

Also illustrated in FIG. 1a is the opening 30 on the receiving end 34 of the receptacle cap 12. The opening 30 enables an optical ferrule to be inserted into the inner tube 35 of the receptacle cap 12. An alignment sleeve 36, preferably constructed of a ceramic material, is mounted and effectively axially retained within the inner surface of the receptacle cap 12. The alignment sleeve 36 functions to properly position and align an optical ferrule inserted in the inner tube 35 via the opening 30.

FIG. 1b is an end view of the opening 30 of the receptacle cap 12 shown in and taken along line 1b-1b of FIG. 1. Illustrated are the flat surfaces 19 on the outer surface of the receiving end 34 of the receptacle cap 12. Also illustrated are the outer perimeter of the base end 15 of the receptacle cap 12, the end face 21 of the optical ferrule 24 containing the optical fiber 14, and the alignment sleeve 36. The sloped edge 37 (FIG. 2) on the opening 30 is shown too.

FIG. 1c is an enlarged view first end 13 of the optical fiber stub 10 and the base end 15 of the receptacle cap 12 shown in FIG. 1a. Also illustrated are the optical fiber 14, the inner chamber 18, the epoxy resin 32, the optical ferrule 24, and the alignment sleeve 36.

In accordance with a first embodiment of the present invention, the outer surface 17 of the first end 13 of the optical fiber stub 10 is threaded, and the inner surface 23 of the base end 15 of the receptacle cap is threaded to a matching size, thus enabling the base end 15 of the receptacle cap 12 to the screwed on and over the first end 13 of the optical fiber stub 10. The first end 13 of the optical fiber stub 10 include a stop plate 38 to terminate the rotation of the base end 15 of the receptacle cap 12 over the first end 13 of the optical fiber stub 10.

Figure 2:
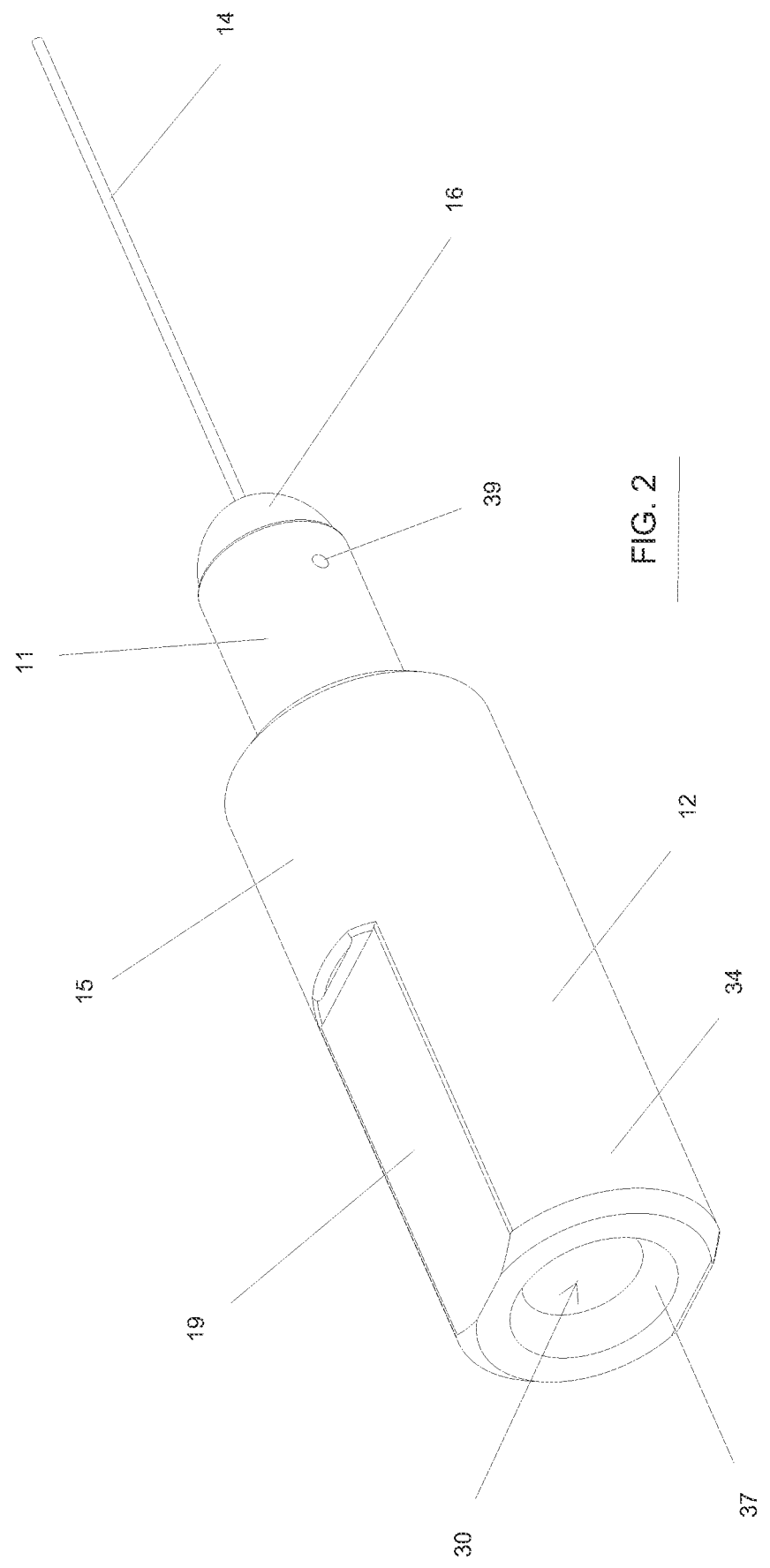

FIG. 2 is a perspective view of the optical fiber stub 10 and receptacle cap 12 shown in FIG. 1. Illustrated are the optical fiber 14, the support resin 16, the second end 11, the base end 15, and the receiving end 34 of the receptacle cap 12. The opening 30 of the inner tube of the receptacle cap 12 and the include edge 37 also are illustrated. Additionally, an indent marker 39 is included on the second end 11 of the optical fiber stub 10 to allow a user to visually rotate and align the angle on the end of fiber 14 to a receiving optical module into which the fiber stub body 10 is normally soldered with metal solder. The indent or notch 39 allows an angle of a cleave at the tip of the optical fiber 14 (not shown) be rotationally aligned by a user.

Figure 3:
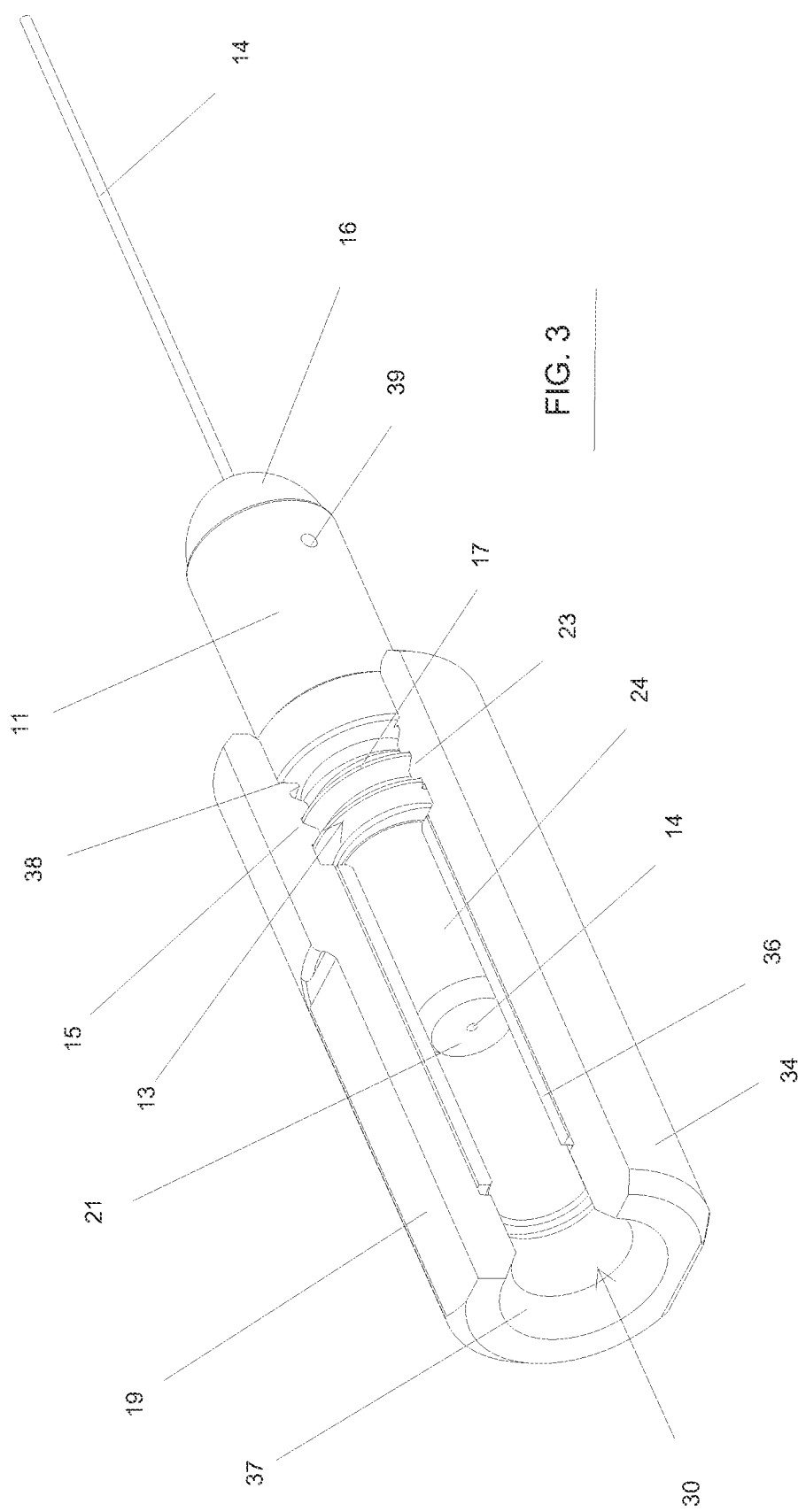
FIG. 3 is a cut away view of the optical fiber stub and the receptacle cap shown in FIG. 2.

FIG. 3 is a cut away view of the receptacle cap 12 shown in FIG. 2. Illustrated are the opening 30, sloped edge 37, flat surface 19, and optical fiber stub 10. Further illustrated are the end face 21 of the ferrule 24, the threaded outer surface 17 on the first end 13 of the optical fiber stub 10 and the threaded inner surface 23 of the base end 15 of the receptacle cap 12. The stop plate 38 and the notch 39 also are illustrated.

Referring now to the drawings, FIG. 4a is a side view of a hermetic fiber stub body 100 configured in accordance with another embodiment of the present invention. An optical fiber 140 and a ferrule 200 are connected to an opposing first or front end 150 and a second or back end 190 of the stub body 100. Support resin 160 is applied on top of a low melting point glass seal 240 (FIG. 4c) to support the mechanical transition of the optical fiber 140 exiting out of the glass seal 240. For the purpose of this application, low melting point glass is defined as glass having a melting point below 400 degrees Celsius. Without the support resin 16, the glass seal 240 and the optical fiber 140 transition or connection would be prone to breakage. The outer end or end face 210 of the ferrule 20 is tapered 220 for easier insertion into a split sleeve (not shown). The end-face 210 of the ferrule 200 and the optical fiber 140, which is glued within the ferrule 200, are both typically polished to a fine finish to allow an efficient optical connection to another connector interface via a split sleeve arrangement.

An indent marker 230 is used on the outer surface of the stub body 100 to allow a user to visually rotate and align the angle on the end of fiber 140 to a receiving optical module into which the stub body 100 is normally soldered with metal solder. Additionally, the indent marker 230 can be used to rotationally orientate stress rods of the optical fiber 140 to the module body 100 if the optical fiber 140 is a polarization maintaining optical fiber. The indent or notch 230 allows the angle of the cleave 250 shown in FIG. 1b at the tip 120 of the optical fiber 140 to be rotationally aligned by a user. It is important for the polarization maintaining (PM) fiber version, as that fiber has stress rods normally angularly aligned to the cleave 250 and the whole PM orientation of the finished assembly, which needs to be easily seen by a user. In a singlemode (SM) version the indent 230 is used to enable a user to know which orientation the angled cleave 250 is relative to the whole body 100, as this can be difficult to determine.

FIG. 4b is an enlarged view of the end 120 of the optical fiber 140. The end 120 of the optical fiber 140 is cleaved, polished, cut or ablated at a slight angle 250 from being perpendicular to the longitudinal direction of the optical fiber 140 in order to prevent back reflection of optical signals being carried by the optical fiber 140. The end or tip 120 of optical fiber 140 also can be finished to be perpendicular to the longitudinal direction of the optical fiber 140 and anti-reflection coated at its tip 120 to reduce back reflections.

FIG. 4c is a cross-sectional view of the hermetic fiber stub body 100 shown in FIG. 4a. Illustrated are the optical fiber 140 and the support resin 160 for the glass hermetic seal 240. The support resin 160 is typically used to mechanically support the transition of the optic fiber 140 to air from the hard glass hermetic seal 240. The support resin 160 preferably is an acrylate type resin that is cured by ultraviolet (UV) light. Further illustrated in FIG. 4c is the optical fiber 140 extending completely through the stub body 100 and to the outer end 210 of the ferrule 200. The ferrule tip or end 210 may have a chamfer 220. A pass-through or smaller inner channel 170 is provided into which the optical fiber 140 is typically hermetically sealed with the glass seal 240, for example, which is low melting point glass. The smaller inner chamber 170 opens to the first end 150 of the stub body 100 via an aperture 270. A larger inner chamber 180 is shown within the stub body 100. The optical fiber 140 passes through the support resin 160, the glass seal 240, the channel 170, the inner chamber 180, and the ferrule 200. The hermetic glass seal 240 forms a hermetic seal around the optical fiber 140 between the support resin 160 and in the channel 170. The extension 360 of the stub body 100, epoxy resin 260, and vent slot or groove 300 also are shown in FIG. 4c, but will be described in more detail in regard to FIG. 5a.

FIG. 5a is an enlarged cross-sectional view of the end of the optical ferrule 200 within the hermetic stub body 100, and the optical fiber 140 shown in FIG. 4c. Further illustrated is the epoxy resin 260 used for optical fiber termination within the ferrule 200. The optical fiber 140 is shown extending into the stub body 100 and through the ferrule 200. The channel 180 is shown within the stub body 100. Chamfers or rounded ends 380 are included on the end 190 of extension 360 of the stub body 100. The vent slot or groove 300 is shown allowing gasses created at the opposing end of the fiber stub 100 to pass out of chamber 180 to the outside through a chamfer or bevel 320 at the outside end of the vent 300.

FIG. 5b is an enlarged end view of the assembly shown in and taken along line 5b-5b of FIG. 4a looking towards the ferrule end 220. In accordance with the present invention, illustrated is the vent 300 between the chamfer 220 of the ferrule 200 and the bevel 320 on the extension 360 of the stub body 100. Also shown are the chamfer or rounded end 380 on the extension 360 of the stub body 100 and the optical fiber 140 within the ferrule 200.

In accordance with the present invention, a notch, groove, scallop, slot, or gas vent 300 is located between the extension 360 of the fiber stub body 100 and the ferrule 200. The gas vent 300 enables gas created during the hermetic glass sealing process of the low melting glass seal 240, as shown in FIG. 4c, to pass into the inner chambers 170 and 180 of the hermetic fiber stub body 100, exhausting safely past ferrule 200, through vent 300, and out bevel 320 without damaging the integrity of the hermetic glass seal material 240 during and after the hermetic glass sealing process.

A user will typically metal solder the stub body 100 into a hole or pipe in a module about half way along the length of the stub body 100. The metal solder hermetically seals the stub body 100 to the module wall within which the stub body 100 is to be located. The tip of the optical fiber 140 located within the ferrule 200 is then coupled to an emitter or detector, which is protected from the outside environment by the metal solder seal of the stub body 100 to a module box, and furthermore, outside elements or materials in the environment that may pass around the ferrule 200 and into the cavity 180, are then blocked from going into the stub body 100 by the glass seal 240.

Figure 6:
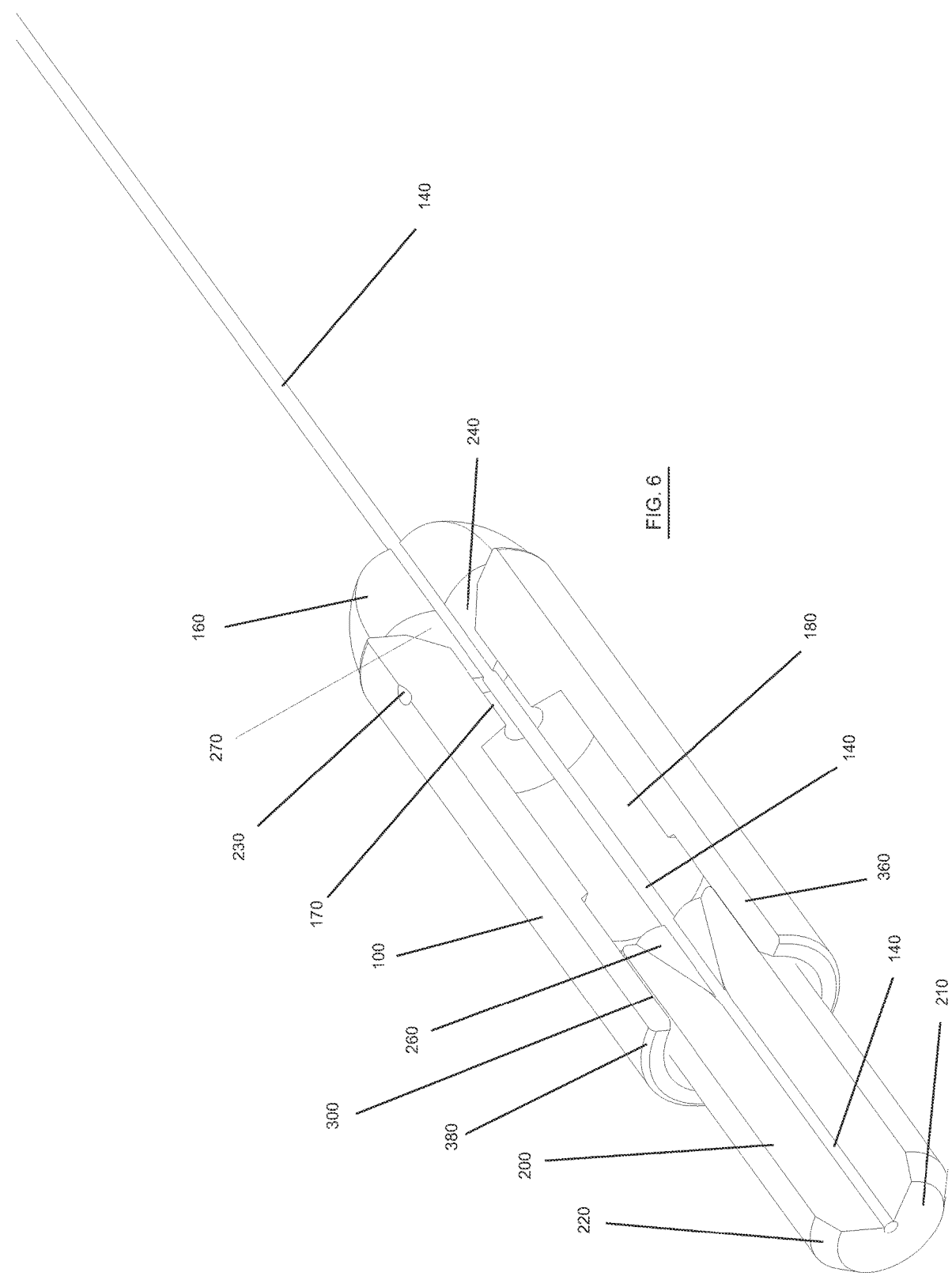

FIG. 6 is a cut away view of the hermetic stub body 100, the ferrule 200, and the optical fiber 140, shown in FIGS. 4a, 4c, 5a, and 5b. Also shown are the indent or notch 230, the outer end 210 and chamfer 220 of the ferrule 200, and the rounded end 380 of the extension 360 of the stub body 100. The smaller inner chamber 170 and the larger inner chamber 180 are shown, as well as the support resin 160, the hermetic glass seal 240, and the epoxy or resin 260 used for optical fiber termination. In accordance with the present invention, the gas vent 300 and bevel 320 at the outer end 190 of the extension 360 are further illustrated.

Referring back to FIGS. 4a and 4c, and in accordance to an alternative embodiment to the vent 300 configuration, a relatively small aperture or vent hole 231 can be located in a radial direction passing through the extension 360 of the stub body 100. The vent hole 231 provides a small passage from within the larger inner chamber 180 of the stub body 100 to the ambient environment surrounding the outer surface of the extension 360 of the stub body 100. The vent hole 231 needs to be very carefully positioned outside the region of the outer diameter of the extension 360 of the stub body 100 that is later metal soldered into a customer's package wall/pipe. Otherwise metal solder can weep through the vent hole 231 and into the inside of the TROSA stub body 100. Additionally, drilling a radial hole, such as the vent hole 231, is likely to be more expensive than broaching the longitudinal vent 300, wherein the ceramic pressed in and the same longitudinal direction, creating the optical connector interface to form the vent slot 300.

Figure 7A:
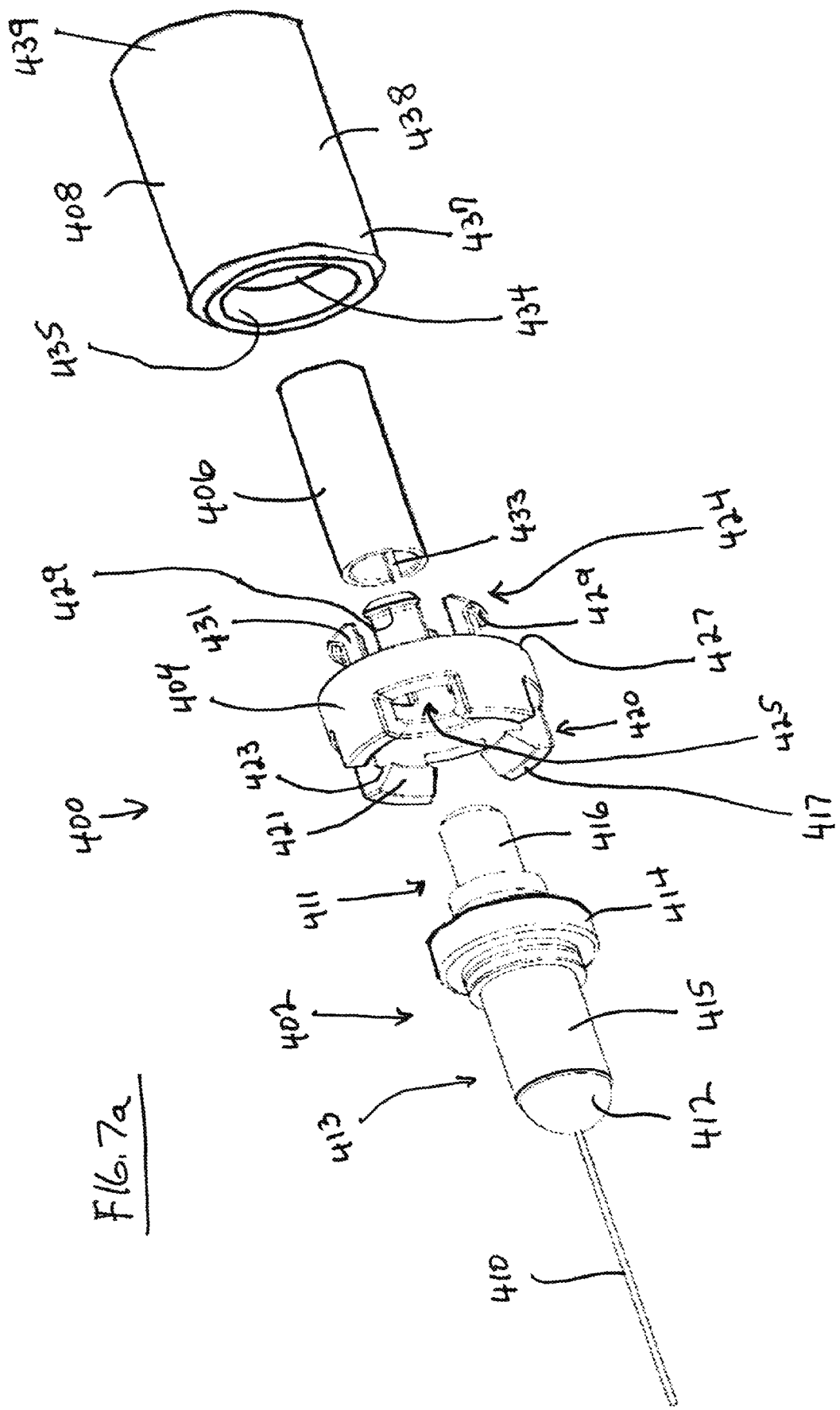
FIG. 7a is an exploded perspective view of an optical fiber stub assembly having a receptacle cap that is attached with a clip in accordance with another embodiment of the present invention.

Referring to FIG. 7a, illustrated is an optical fiber stub assembly 400 including an optical fiber stub body 402, a polymer insulating insert 404, a ceramic sleeve 406, and a removable cap or stainless steel chimney 408. The optical fiber stub body 402 has a first end 411 and a second end 413. An optical fiber 410 is shown exiting a hermetic glass seal on the second end 413 of the optical fiber stub body 402. The optical fiber 410 preferably is a titanium doped silica clad fiber, such as the Corning® Titania-Clad (single mode/bend insensitive), manufactured and sold by Corning Incorporated. The titanium doped silica clad fiber is preferred as it is more robust and fatigue resistant than a standard fiber types, and moreover, has very low loss performance if bent tightly. A base 414 is located on the outer surface 415 of the stub body 402. The base 414 is preferable a ridge surrounding the outer surface 415 of the optical fiber stub body 402. The second end 413 of the optical fiber stub body 402 includes a support resin 412 enclosing the hermetic glass seal. A ceramic optical ferrule 416 is located within the first end 411 of the optical fiber stub body 402.

Also illustrated is a polymer insulating insert 404 to be attached to the first end 411 of the stub body 402. A first side 417 of the polymer insulating insert 404 includes a first plurality of clips 420 configured to clip onto the base 414 of the stub body 402. Each clip 421 of the first plurality of clips 420 includes an edge 423 that is configured to contact or grip the base 414 to secure the polymer insulating insert 404 to the stub body 402. The polymer insulating insert 404 includes a hole or aperture 425 in the center of the circular configuration of the polymer insulating insert 404 through which the ceramic ferrule 416 passes through when the polymer insulating insert 404 is secured to the stub body 402 via the first plurality of clips 420. The first plurality of clips 420 face inward towards the center of the polymer insulating insert 404. The polymer insulating insert 404 can be separated from the stub body 402 by prying the first plurality of clips 420 from the base 414 of the stub body 402.

The receptacle cap or stainless steel chimney 408 has a tubular configuration with an inner surface 435 and an outer surface 438. An internal rim or internal edge 434 is located on the inner surface 435 of the receptacle cap 408, and the receptacle cap 408 includes a locking end 437 and a receiving end 439. The receiving end 439 of the receptacle cap 408, opposite the locking end 437, is configured to receive an optical ferrule to be positioned and aligned adjacent to or connected to the ceramic ferrule 416. The second side 427 of the polymer insulating insert 404 includes a second plurality of clips 424 that face outward from the center of the polymer insulating insert 404. The edges 429 of each clip 431 of the second plurality of clips 424 are configured to contact or grasp the inner rim or edge 434 within the locking end 437 of the receptacle cap or chimney 408 to secure the polymer insulating insert 404 to the receptacle cap 408.

The ceramic split sleeve or alignment sleeve 406 is sized to fit over the ceramic ferrule 416 and an optical ferrule being received by receiving end 439 of the receptacle cap 408, thus properly aligning the ceramic ferrule 416 with an optical ferrule being inserted into the receiving end 439 of the receptacle cap 408. The split ceramic sleeve 406 is located within the aperture 425 of the polymer insulating insert 404 and the receptacle cap 408. A slit 433 in the alignment sleeve 408 runs longitudinally along the length of the tubular body to enable the alignment sleeve 406 to snuggly fit around the optical ferrule 416 and an optical ferrule being received in the receiving end 439 of the receptacle cap 408 in order to properly align two adjacent optical ferrules.

The polymer insulating insert 404, due to its polymer construction, is not electrically conductive, and thus functions as an electrical insulator between the stub body 402 and the receptacle cap 408. Additionally, the polymer insulating insert 404 can be formed of different colors, thus easily identifying if the optical fiber stub assembly 400 is to function as an input or an output of optical signals.

FIG. 7b illustrates a perspective, cut-away, non-exploded view of the fiber optic stub assembly 400 shown in FIG. 7a. Illustrated are the optical fiber stub body 402, the polymer insulating insert 404, ceramic split sleeve 406, and the receptacle cap 408 assembled together. More specifically, the optical fiber 410 is shown exiting the hermetic glass seal within the support resin 412 on the second end 413 of the optical fiber stub body 402. An indent marker 230, as previously discussed in regard to FIGS. 4a and 4c, is illustrated, along with the base 414 and optical ferrule 416 of the optical fiber stub body 402.

The polymer insulating insert 404 is shown connected to the base 414 of the optical fiber stub body 402 by the first plurality of clips 420, wherein each edge 423 of the clips 421 are grasping the base 414. Similarly, the edges 429 of the clips 431 of the second plurality of clips 424 are shown grasping to the inner ridge or inner edge 434 of the receptacle cap 408, thereby connecting the polymer insulating insert 404 to the receptacle cap 408.

The ceramic split sleeve 406 is shown located within the receptacle cap 408 and the polymer insulating insert 404, and around the optical ferrule 416 containing the optical fiber 410 of the optical fiber stub body 402. The receiving end 439 and the locking end 437 of the receptacle cap 408 also are illustrated.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An optical fiber stub assembly, comprising:
    a stub body having a first end and a second end, and a base extending beyond an outer surface of the stub body;
    a receptacle cap having a tubular body with an inner surface and an outer surface, the receptacle cap including a locking end and a receiving end, wherein the inner surface of the locking end includes an edge for receiving and securing a clip therein; and
    a polymer insulating insert having a first clip on a first side and a second clip on a second side, wherein the first clip is configured to clip onto and secure the polymer insulating insert to the base of the stub body, and the second clip is configured to clip onto and secure the polymer insulating insert to the edge on the inner surface of the locking end of the receptacle cap.

2. The optical fiber stub assembly of claim 1, further comprising:
    an optical ferrule on the first end of the stub body.

3. The optical fiber stub assembly of claim 1, further comprising:
    an optical fiber within the optical fiber stub body; and
    wherein the optical fiber is a titanium doped silica clad fiber.

4. The optical fiber stub assembly of claim 1, further comprising:
    an optical ferrule on the first end of the stub body; and
    an alignment sleeve with a tubular body surrounding the optical ferrule on the first end of the stub body and also located within an aperture in a center of the polymer insulating insert, and the alignment sleeve also is located within the receptacle cap, and the alignment sleeve is configured to receive and properly align an optical ferrule to be received in the receiving end of the receptacle cap with the optical ferrule in the first end of the stub body.

5. The optical fiber stub assembly of claim 4, wherein the alignment sleeve includes a slit running longitudinally along the tubular body, thereby enabling the alignment sleeve to fit snuggly around the optical ferrule in the first end of the stub body and properly align an optical ferrule being received within the receiving end of the receptacle cap.

6. The optical fiber stub assembly of claim 4, wherein the alignment sleeve has a ceramic construction.

7. The optical fiber stub assembly of claim 1, further comprising:
    a first plurality of clips on the first side of the polymer insulating insert, and a second plurality of clips on the second side of the polymer insulating insert.

8. The optical fiber stub assembly of claim 7, wherein edges of the first plurality of clips face inward towards a center of the polymer insulating insert.

9. The optical fiber stub assembly of claim 7, wherein edges of the second plurality of clips face outward away from a center of the polymer insulating insert.

10. The optical fiber stub assembly of claim 1, wherein the edge for receiving and securing a clip therein on the inner surface of the receptacle cap is provided by a ridge on the inner surface of the receptacle cap.

11. The optical fiber stub assembly of claim 1, wherein the edge for receiving and securing a clip therein on the inner surface of the receptacle cap is provided by a rim on the inner surface of the receptacle cap.

12. The optical fiber stub assembly of claim 1, wherein a color of the polymer insulating insert identifies a direction of travel of optical signals passing within the optical fiber stub assembly.

13. The optical fiber stub body of claim 1, wherein the receptacle cap is configured of stainless steel.

14. The optical fiber stub body of claim 1, wherein the polymer construction of the polymer insulating insert is electrically non-conductive, and the polymer insulating insert thereby functions as an electrical insulator between the fiber optic stub body and the receptacle cap.

15. An optical fiber stub assembly, comprising:
    a stub body having longitudinal configuration, a smaller inner chamber, a larger inner chamber, a first end, and a second end;
    a ferrule located within the larger chamber and extending out the second end of the stub body;
    an optical fiber having one end extending beyond the first end of the optical fiber and through the smaller inner chamber, the larger inner chamber, and a second end of the optical fiber is flush with an outer end of the ferrule that extends out beyond the second end of the stub body; and
    the stub body includes a vent hole located passing from the larger inner chamber to an outer surface of the stub body, wherein the vent hole enables gases generated during a sealing process of the optical fiber within stub body to escape to an ambient environment.

16. The optical fiber stub body of claim 15, wherein the vent hole extends radially outward from a center of the larger inner chamber.

17. The optical fiber stub body of claim 15, wherein the optical fiber is a titanium doped silica clad fiber.

18. The optical fiber stub assembly of claim 15, wherein an end of the optical fiber extending out the first end of the stub body includes a cleave, and further comprising:
    an indent marker on an outer surface of the stub body to allow a user to visually rotate and align an angle on a cleave at an end of the optical fiber extending out the first end of the stub body to a receiving optical module into which the stub body is typically soldered.

19. An optical fiber stub assembly, comprising:
    a stub body having a first end and a second end, and an edge on an outer surface of the stub body;
    a receptacle cap having a tubular body with an inner surface and an outer surface, the receptacle cap including a locking end and a receiving end, wherein the inner surface of the locking end includes an edge for receiving and securing a clip therein; and a polymer insulating insert having a first clip on a first side and a second clip on a second side, wherein the first clip is configured to clip onto and secure the polymer insulating insert to the edge on the outer surface of the stub body, and the second clip is configured to clip onto and secure the polymer insulating insert to the edge on the inner surface of the locking end of the receptacle cap.

\* \* \* \* \*